(12) United States Patent
Yan et al.

(10) Patent No.: US 8,355,196 B2
(45) Date of Patent: Jan. 15, 2013

(54) ELECTROPHORETIC DISPLAY DEVICE

(75) Inventors: Li-Jia Yan, Shenzhen (CN); Ying Luo, Shenzhen (CN); Kuan-Hong Hsieh, Taipei Hsien (TW); Chun-Wei Pan, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 12/845,700

(22) Filed: Jul. 28, 2010

(65) Prior Publication Data
US 2011/0235159 A1      Sep. 29, 2011

(30) Foreign Application Priority Data
Mar. 25, 2010   (CN) .......................... 2010 1 0132369

(51) Int. Cl.
*G02B 26/00* (2006.01)
*G02B 26/08* (2006.01)
*G02F 1/29* (2006.01)

(52) U.S. Cl. ...................... 359/296; 359/295; 359/298

(58) Field of Classification Search .......... 359/290–292, 359/295–296, 298
See application file for complete search history.

(56) References Cited

U.S. PATENT DOCUMENTS

| | | | |
|---|---|---|---|
| 7,283,119 B2 * | 10/2007 | Kishi | 345/107 |
| 2003/0231162 A1 | 12/2003 | Kishi | |
| 2007/0008278 A1 * | 1/2007 | Johnson et al. | 345/107 |

* cited by examiner

*Primary Examiner* — Thomas K Pham
*Assistant Examiner* — Brandi Thomas
(74) *Attorney, Agent, or Firm* — Altis Law Group, Inc.

(57) ABSTRACT

An electrophoretic display device includes a common electrode, an electrophoresis layer, and pixel electrodes. The electrophoretic layer includes cavities, with each cavity arranged between one of the pixel electrodes and the common electrode, and comprises suspension fluid, first type charged particles, and second type charged particles. The first type charged particles and the second type charged particles are dispersed in the suspension fluid. Three cavities constitute a pixel unit. The first type charged particles and the second type charged particles in each of the three cavities constituting the pixel unit are one of red, green, and blue particles, and one of yellow, magenta, and cyan particles, respectively.

12 Claims, 2 Drawing Sheets

1

ELECTROPHORETIC DISPLAY DEVICE

BACKGROUND

1. Technical Field

The present disclosure relates to display devices and, more particularly, to a color electrophoretic style display device.

2. Description of Related Art

Electrophoretic display devices have been the subject of intense research and development for a number of years. Electrophoretic display devices have attributes of good brightness and contrast, wide viewing angles, state bistability, and low power consumption, compared with liquid crystal displays. Nowadays, electrophoretic display devices are capable of displaying multicolor images by controlling each pixel to display a desired color by primary color mixing, such as RGB color mixing or YMC color mixing. Usually, when displaying a moving image, RGB color mixing mode is a better choice. When displaying a static image, YMC color mixing mode is a better choice. However, conventional electrophoretic display devices can only work in either the RGB color mixing mode or the YMC color mixing mode. Conventional electrophoretic display devices cannot switch between the RGB color mixing mode or YMC color mixing mode according to need.

It is desirable to provide an electrophoretic display device that can switch between a RGB color mixing mode and a YMC color mixing mode according to need.

BRIEF DESCRIPTION OF THE DRAWINGS

The components in the drawings are not necessarily drawn to scale, the emphasis instead being placed upon clearly illustrating the principles of the electrophoretic display device. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
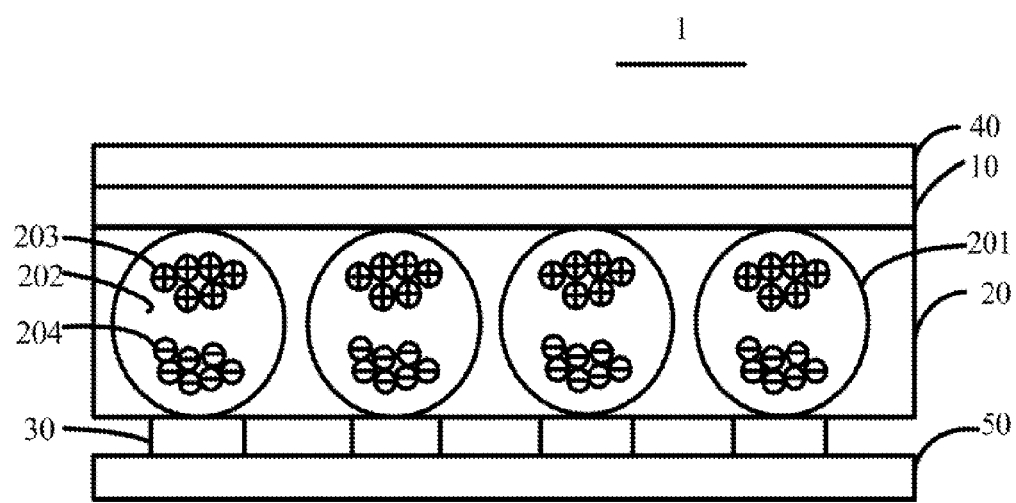
FIG. 1 is a schematic, cross-sectional view showing an electrophoretic display device in accordance with an embodiment.

Referring to FIG. 1, an electrophoretic display device 1 includes a common electrode 10, an electrophoretic ink layer 20, and a plurality of pixel electrodes 30. The electrophoretic ink layer 20 is arranged between the common electrode 10 and the pixel electrodes 30. The common electrode 10 corresponds to a display surface of the electrophoretic display device 1. In the embodiment, the common electrode 10 is grounded and is transparent and can be made of indium tin oxide.

The electrophoretic ink layer 20 includes a plurality of cavities 201. Each cavity 201 is positioned between the common electrode 10 and one pixel electrode 30, and includes suspension fluid 202, a plurality of first type charged particles 203, and a plurality of second type charged particles 204. The first type charged particles 203 and the second type charged particles 204 are dispersed in the suspension fluid 202. In the embodiment, the cavities 201 are microcapsules and can be spherical, elliptical, or tubular. In other embodiments, the cavities 201 may be micro-cups.

Figure 2:
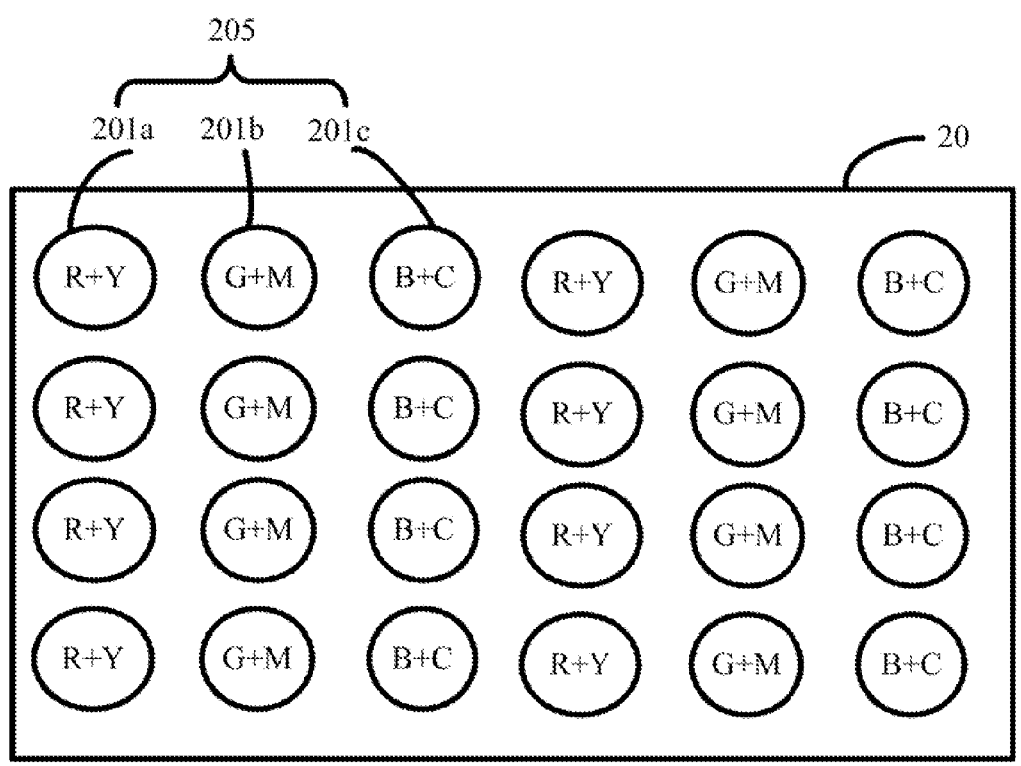
FIG. 2 is a schematic, planar view of the electrophoretic display device of FIG. 1.

Referring also to FIG. 2, the cavities 201 are arranged in a matrix pattern and three cavities 201a, 201b, and 201c constitute a pixel unit 205. The charged particles 203 can be one of red particles, green particles, and blue (RGB) particles. The charged particles 204 can be one of yellow particles, magenta particles, and cyan (YMC) particles. For example, as shown in FIG. 2, in one pixel unit 205, the charged particles 203, 204 in cavity 201a are R (red) particles and Y (yellow) particles, the charged particles 203, 204 in cavity 201b are G (green) particles and M (magenta) particles, and the charged particles 203, 204 in cavity 201c are B (blue) particles and C (cyan) particles. Therefore, each pixel unit 205 includes both the RGB particles and the YMC particles.

In the embodiment, the first type charged particles 203 have a charge polarity opposite to a charge polarity of the second type charged particles 204. In the embodiment, the charged particles 203 are positively charged and the charged particles 204 are negatively charged. When the RGB color mixing mode is needed, a first, positive voltage can be applied to one of the pixel electrodes 30 to cause the first type charged particles 203 to move to the common electrode 10. If voltage with different amplitude is applied to one of the pixel electrodes 30, a different amount of the charged particles 203 of a cavity 201 corresponding to the pixel electrode 30 are driven toward the common electrode 10, and the cavity 201 displays color of a different level. Therefore, the pixel unit 205 can display different colors when the three cavities 201 constituting the pixel unit 205 display colors of different level.

Similarly, when the YMC color mixing mode is needed, a second, negative voltage can be applied to the pixel electrodes 30 to cause the second type charged particles 204 to move to the common electrode 10. Each pixel unit 205 can display different colors by applying different amplitude of voltages to the pixel electrodes 30 corresponding to three cavities 201 constituting the pixel unit 205.

In other embodiments, a pulse width modulation driving method may be used. Specifically, by applying driving pulses of different pulse widths to the cavities 201a, 201b, and 201c, different amount of particles are driven toward the common electrode 10. In yet another embodiment, a pulse rate modulation driving method may be used. Specifically, by applying different numbers of driving pulses to each cavity 201a, 201b, and 201c in a finite driving period that is the same for each of the cavities 201a, 201b, and 201c, different amount of particles are driven toward the common electrode 10.

In another embodiment, the suspension fluid 202 is black in color. Applying a voltage to one of the pixel electrodes 30 causes the RGB particles and the YMC particles to move away from the display surface of the electrophoretic display device 1, and causes the cavity 201 corresponding to the pixel electrode 30 to display a black color. The pixel unit 205 can also display different colors by combining the colors displayed by the cavities 201a, 201b, and 201c. For example, if cavities 201a, 201b, and 201c of a pixel unit 205 display red/yellow, green/magenta, and blue/cyan, respectively, then the pixel unit 205 displays a mixed color combination of red/yellow, green/magenta, and blue/cyan. If the cavities 201a, 201b, and 201c of a pixel unit 205 display red/yellow, green/magenta, and black respectively, the pixel unit 205 displays a mixed color combination of red and green, or yellow and magenta. If the cavities 201a, 201b, and 201c of a pixel unit 205 display red/yellow, black, and black respectively, the pixel unit 205 displays a red/yellow color. If the cavities 201a, 201b, and 201c of a pixel unit 205 all display black, then the pixel unit 205 displays a black color.

The electrophoretic display device 1 can further include a protection layer 40 and a lower substrate 50. The protection layer 40 is used to protect the electrophoretic display device 1 from damage. The pixel electrodes 30, the electrophoretic ink layer 20, the common electrode 10, and the protection layer 40 are formed on the lower substrate 50 in sequence.

In other embodiments, at least one of the RGB particles have a charge polarity substantially the same as the charge polarity of the one of the YMC particles. Upon applying positive or negative voltage to the pixel electrodes 30, at least one of the RGB particles and YMC particles move to the common electrode 10, and the cavity 201 corresponding to the pixel electrode 30 displays the corresponding color. The pixel unit 205 can display a mixed color combination of three particles chosen from the RGB particles and the YMC particles. For example, if cavities 201a, 201b, and 201c of a pixel unit 205 display red, magenta, and cyan, respectively, then the pixel unit 205 displays a mixed color combination of red, magenta, and cyan.

In yet another embodiment, the first type charged particles 203 and the second type charged particles 204 have the same polarity of charge but substantially different electrophoretic mobilities, and the suspension fluid 202 may be colored or uncolored. One appropriate addressing scheme is to pull all the particles to the pixel electrodes 30 with the appropriate electric field. The reverse electric field is then applied only as long as it takes the more mobile of the two types of particles to reach the common electrode 10. This produces the color of the higher mobility particles. To produce the color of the lower mobility particles, all of the particles are pulled to the common electrode 10. Then, the field is reversed long enough that the more mobile particles are pulled away from the common electrode 10, leaving the lower mobility particles adjacent to the common electrode 10. This produces the color of the lower mobility particles.

Therefore, each cavity 201 can be switched among three states, namely a first opaque state, in which the first type charged particles 203 are visible, a second opaque state, in which the second type charged particles 204 are visible, and a "transparent" state, in which both types of particles are moved to a side wall of the capsule by dielectrophoresis (DEP) and the color of the suspending fluid is visible. If the suspending fluid is uncolored, the transparent state is actually transparent and may be used to display the color of a reflector or filter disposed on the opposed side of the cavity 201 from the viewing surface thereof, as previously described.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An electrophoretic display device comprising:
a plurality of pixel electrodes;
a common electrode; and
an electrophoretic ink layer comprising a plurality of cavities, each cavity being arranged between one of the pixel electrodes and the common electrode, and comprising a suspension fluid with a black color, a plurality of first type charged particles dispersed in the suspension fluid, and a plurality of second type charged particles dispersed in the suspension fluid;
wherein, three cavities constitutes a pixel unit, the first type charged particles and the second type charged particles in each pixel unit are one of red, green, and blue (RGB) particles, and one of yellow, magenta, and cyan (YMC) particles, respectively; when applying a voltage to one of the pixel electrodes by causing the RGB particles and the YMC particles both to move away from the common electrode, the cavity corresponding to the pixel electrode displays the black color of the suspension fluid; when only one cavity of one pixel unit displays the black color, the pixel unit displays a mixed color combined by two of the RGB particles or YMC particles; when two cavities of one pixel unit display the black color, the pixel unit displays the color of one of the RGB particles or YMC particles; and when three cavities of one pixel unit all display black color, the pixel unit displays the black color.

2. The electrophoretic display device according to claim 1, wherein the first type charged particles have a charge polarity opposite to a charge polarity of the second type charged particles.

3. The electrophoretic display device according to claim 2, wherein, application of a first voltage to one of the pixel electrodes causes the first type charged particles of one of the cavities to move to the common electrode, the cavity displays the color of the first type charged particles, and the pixel unit displays a mixed color combination of red, blue, and green.

4. The electrophoretic display device according to claim 3, wherein if an amplitude of the first voltage applied to the pixel electrode is different, an amount of the first type charged particles driven toward the common electrode is different, and the cavity corresponding to the pixel electrode displays a color of different level accordingly.

5. The electrophoretic display device according to claim 2, wherein, application of a second voltage to one of the pixel electrodes causes the second type charged particles of one of the cavities corresponding to the pixel electrode to move towards the common electrode, the cavity displaying the color of the second type charged particles, and the pixel unit constituted by three cavities displaying a mixed color combined by yellow, magenta, and cyan.

6. The electrophoretic display device according to claim 5, wherein if an amplitude of the second voltage applied to one of the pixel electrodes is different, an amount of the second type charged particles driven toward the common electrode is different, and the cavity corresponding to the pixel electrode displays a color of different level accordingly.

7. The electrophoretic display device according to claim 1, wherein the first type charged particles and the second type charged particles have the same polarity of charge but substantially different electrophoretic mobilities.

8. The electrophoretic display device according to claim 1, wherein the cavities are microcapsules.

9. The electrophoretic display device according to claim 1, wherein the cavities are micro-cups.

10. The electrophoretic display device according to claim 8, wherein the shape of the microcapsules is one selected from the group consisting of spherical, elliptical, and tubular shape.

11. The electrophoretic display device according to claim 7, wherein all the particles are first pulled to the pixel electrodes by an electric field, then a reverse electric field is applied until the more mobile of the first or second type charged particles reach the common electrode, to produce the color of the higher mobility particles; all of the particles are first pulled to the common electrode, then the reverse electric field is applied until the more mobile of the first or second type charged particles are pulled away from the common electrode, such that the lower mobility particles are adjacent to the common electrode, to produce the color of the lower mobility particles.

12. An electrophoretic display device comprising:
a plurality of pixel electrodes;

a common electrode; and an electrophoretic ink layer comprising a plurality of cavities, each cavity being arranged between one of the pixel electrodes and the common electrode, and comprising a suspension fluid with a black color, a plurality of first type charged particles dispersed in the suspension fluid, and a plurality of second type charged particles dispersed in the suspension fluid;

wherein, three cavities constitutes a pixel unit, the first type charged particles and the second type charged particles in each pixel unit are one of red, green, and blue (RGB) particles, and one of yellow, magenta, and cyan (YMC) particles, respectively; at least one of the RGB particles have a charge polarity substantially the same as the charge polarity of the one of the YMC particles; when applying a voltage to one of the pixel electrodes by causing the RGB particles and the YMC particles both to move away from the common electrode, the cavity corresponding to the pixel electrode displays the black color of the suspension fluid; when only one cavity of one pixel unit displays the black color, the pixel unit displays a mixed color combined by two of the RGB particles and YMC particles; when two cavities of one pixel unit display the black color, the pixel unit displays the color of one of the RGB particles and YMC particles; when three cavities of one pixel unit all display black color, the pixel unit displays the black color.

* * * * *